Nov. 6, 1951  S. M. THOMSEN  2,573,817
LUMINESCENT ZINC OXIDE CONTAINING A SMALL AMOUNT OF ZINC SULFIDE
Filed April 29, 1949
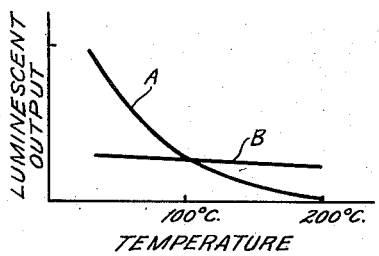
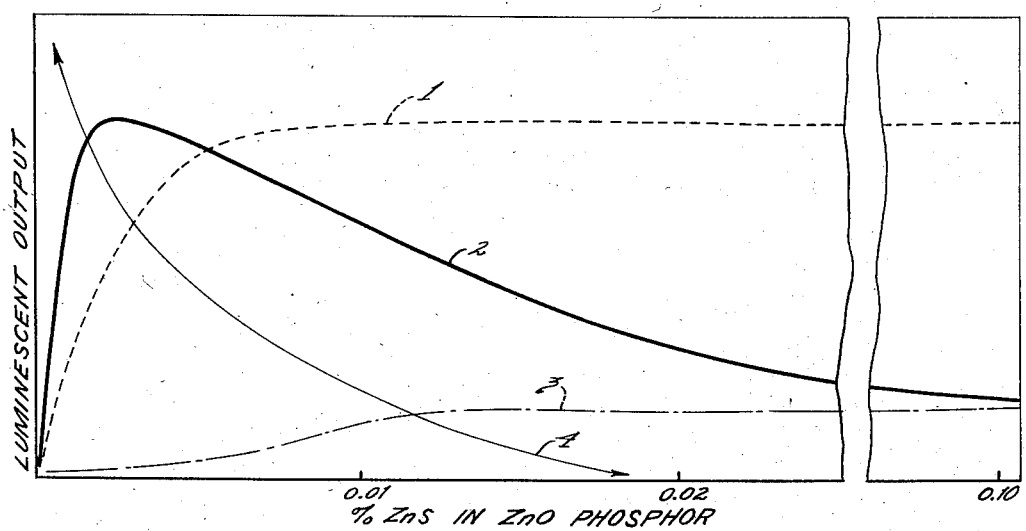
INVENTOR
Soren M. Thomsen
BY
ATTORNEY Patented Nov. 6, 1951

2,573,817

UNITED STATES PATENT OFFICE 2,573,817

LUMINESCENT ZINC OXIDE CONTAINING A SMALL AMOUNT OF ZINC SULFIDE

Soren M. Thomsen, Pennington, N. J., assignor to Radio Corporation of America, a corporation of Delaware Application April 29, 1949, Serial No. 90,303

6 Claims. (Cl. 252—301.6)

This invention relates to improvements in luminescent materials which are especially useful in certain electronic devices in which the luminescent material is subjected to relatively high temperatures. More particularly, the invention relates to materials consisting essentially of zinc oxide phosphors in which certain small percentages of zinc sulfide are present. It has been found that the incorporation of the small percentages of zinc sulfide in the zinc oxide phosphors produces luminescent materials having new and unexpected properties.

It has been known for many years that zinc oxide, when properly treated, exhibits luminescence characteristics under excitation by either ultraviolet radiations or electrons. It has also been known that zinc sulfide, when properly treated, is luminescent under either ultraviolet or electron excitation. However, previously, when zinc oxide phosphors were prepared, it was thought necessary to prepare them with a high degree of purity since even small amounts of some impurities were known to lower their efficiencies to a marked degree.

Previous investigations of zinc oxide phosphors have been carried out, for the most part, at ordinary room temperatures. At room temperatures, the addition of appreciable amounts of other materials, such as zinc sulfide, does lower the efficiency of the oxide under cathode ray excitation. But, when the temperature is raised above 100° C., a marked change in characteristics occurs. With increased temperatures up to 200° C., the efficiency of C. P. zinc oxide phosphors, under either ultraviolet or cathode ray excitation, decreases until it reaches a negligible amount.

Although most electronic devices employing viewing screens coated with luminescent materials operate normally at temperatures well below 100° C., certain devices operate at temperatures which frequently exceed 100° C. In the case of apparatus operating at high temperatures, many of the commonly used phosphors are useless because their luminescent output is too low when they are used at elevated temperatures.

The principal object of the present invention is to provide a phosphor which is both stable at high temperatures and which has a relatively high luminescent output at temperatures above 100° C. when excited by ultraviolet radiations or cathode rays.

This and other objects will be more apparent and the invention will be more readily understood with reference to the following description, including the drawings of which:

Figure 1 is a graph showing luminescent output plotted against temperature. The graph compares the luminescent output versus temperature characteristic of two different phosphors, one of which is a C. P. zinc oxide phosphor and the other of which is a zinc oxide phosphor containing a certain definite percentage of zinc sulfide.

Figure 2 is a graph showing how luminescent output of a zinc oxide phosphor varies with the amount of zinc sulfide added, up to 0.1 per cent by weight, under varying conditions of temperature and excitation.

As shown in Curve A of Figure 1, an ordinary phosphor comprising C. P. zinc oxide decreases rapidly in efficiency with increasing temperature up to 200° C. At 200° C., the efficiency is negligible.

Curve B of Figure 1 is for a zinc oxide phosphor with 0.1 per cent by weight of zinc sulfide incorporated in its crystalline structure. At temperatures below about 100° C., the efficiency of this material is less than that of a phosphor prepared from and comprising C. P. zinc oxide but, at temperatures above about 100° C., the phosphor containing the zinc sulfide has the higher efficiency. This is true for either ultraviolet or cathode ray excitation.

In Figure 2, Curve 1 shows how visible luminescent outputs of zinc oxide phosphors vary with increasing amounts of zinc sulfide present, excitation being by ultraviolet radiations of 3650 Å at 25° C. A similar curve was obtained for luminescent output when the material was excited by ultraviolet radiations of 2537 Å at 25° C.

Curve 2 of Figure 2 shows how visible luminescent outputs of the same zinc oxide phosphors of Figure 1 vary with increasing amounts of zinc sulfide present when cathode rays are used as the source of excitation at 25° C.

Curve 3 of Figure 2 shows how visible luminescent outputs of the same zinc oxide phosphors vary with the amount of zinc sulfide present when the source of excitation is ultraviolet radiation at 3650 Å and when the temperature is 200° C.

Curve 4 of Figure 2 shows how the ultraviolet luminescent output varies with increasing amounts of zinc sulfide present in the same zinc oxide phosphors when the source of excitation is cathode rays at 25° C.

Curve 3 of Figure 2 indicates that, when operating at 200° C. under ultraviolet excitation, as increasing amounts of zinc sulfide are added to a zinc oxide phosphor, a rather sharp rise in the curve of visible luminescence output occurs in the neighborhood of that point on the curve which corresponds to an addition of about 0.01 per cent by weight of zinc sulfide.

The phosphor material of the present invention is prepared by heating zinc oxide of C. P. grade with the required small amount of zinc sulfide (0.01 per cent to 0.3 per cent by weight) at 1000° C., or above, for at least one hour (when samples of about 100 grams weight are used), with the mixture shielded from the atmosphere by a silica cover. A carbon black layer is also used to shield the phosphor while heating. The carbon black serves to prevent oxidation of the sulfide to oxide. Other reducing agents, such as an atmosphere of hydrogen or carbon monoxide, may also be used. If a considerable excess of the sulfide is used in the original mix, the carbon black layer or other reducing agent may be omitted, although the mixture must be mechanically shielded from the atmosphere. In that case, a subsequent roasting in air serves to convert the excess zinc sulfide to zinc oxide. The product is not simply a mechanical mixture of zinc sulfide with zinc oxide but is rather a homogeneous crystalline material with the zinc sulfide incorporated in the crystalline lattice of the zinc oxide.

Although it is preferred to use zinc sulfide as the source of the sulfide ion in the above preparation, it is possible to start with other sources of sulfide ion, such as ammonium sulfide or hydrogen sulfide. The results will be the same in all cases, however, since some of the zinc oxide is converted to zinc sulfide.

The new phosphors, which are prepared as above described, have the characteristic of fast decay. The decay time has been found to be about 10 microseconds, which is about the same as that of ordinary zinc oxide phosphors. Like ordinary zinc oxide phosphors, the phosphors of the present invention may be excited by either photons or charged particles.

It has been found that no more than about 0.3 per cent by weight of zinc sulfide will enter into solid solution with zinc oxide and that addition of amounts greater than 0.3 per cent of zinc sulfide is not beneficial since the excess acts like any other inert ingredient.

It has also been found, as might be expected, that the time of heating necessary to prepare a luminescent material of the present invention from zinc oxide and zinc sulfide depends to a large extent on the weight of material being treated. Thus, heating times as low as 10 minutes may be used if the sample weighs but a few grams. On the other hand, times longer than one hour may be required if very large samples are used. Once the minimum time of heating a particular sample has been reached, there appears to be no further advantage obtained by longer heating.

The temperature to which the mixture should be heated to give best results is 1000° C. Heating to higher temperatures produces no added benefits and merely introduces certain mechanical difficulties such as the forming of clinkers which later may prove troublesome in using the product for practical purposes.

The phosphors of the present invention are unusual in one other respect. Whereas most substances which have been used to activate phosphors in the past have been cations; i. e., copper, silver, etc., the activating substance of the present invention is an anion.

There have thus been provided novel phosphors having a useful luminescent output at relatively high temperatures and in which unexpected results have been obtained by utilizing an anion as activator.

I claim as my invention:

1. A phosphor material consisting essentially of luminescent zinc oxide having incorporated in its crystalline structure 0.01 to 0.3 per cent by weight of zinc sulfide.

2. A phosphor according to claim 1 in which the zinc sulfide is present in an amount equal to about 0.1 per cent by weight of the zinc oxide.

3. A method of preparing a phosphor material comprising mixing with C. P. zinc oxide, sufficient zinc sulfide to provide from 0.01 to 0.3 percent by weight of said zinc sulfide incorporated in the crystalline structure of the product, and heating said mixture out of contact with air for at least 10 minutes at a temperature of at least 1000° C.

4. A method according to claim 3 in which a reducing atmosphere is employed to maintain said mixture out of contact with air.

5. A method according to claim 4 in which said reducing atmosphere is produced by spreading a layer of carbon black over said mixture.

6. A method according to claim 3 in which an original amount of zinc sulfide is used which is substantially more than the amount desired in said product, in which said mixture is maintained out of contact with air by mechanically shielding said mixture, and in which, after said heating, the heated material is roasted, exposed to air, until the excess zinc sulfide is consumed.

SOREN M. THOMSEN.

REFERENCES CITED

The following references are of record in the file of this patent:

UNITED STATES PATENTS

| Number | Name | Date |
|---|---|---|
| 2,310,424 | Goodman | Feb. 9, 1943 |

FOREIGN PATENTS

| Number | Country | Date |
|---|---|---|
| 55,725 | Netherlands | Nov. 16, 1943 |